United States Patent
Gao et al.

(10) Patent No.: US 8,880,091 B2
(45) Date of Patent: *Nov. 4, 2014

(54) RESOURCE MEASUREMENT AND REPORTING METHOD IN LONG TERM EVOLUTION SYSTEM

(71) Applicant: ZTE Corporation, Shenzhen (CN)

(72) Inventors: Yin Gao, Shenzhen (CN); Feng He, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/044,103

(22) Filed: Oct. 2, 2013

(65) Prior Publication Data

US 2014/0031007 A1    Jan. 30, 2014

Related U.S. Application Data

(62) Division of application No. 13/133,794, filed as application No. PCT/CN2008/073858 on Dec. 30, 2008, now Pat. No. 8,577,386.

(51) Int. Cl.
*H04W 72/00* (2009.01)
*H04W 24/10* (2009.01)

(52) U.S. Cl.
CPC ..................... *H04W 24/10* (2013.01)
USPC ............ 455/453; 455/436; 455/438; 455/450

(58) Field of Classification Search
USPC ........................................................ 455/453
See application file for complete search history.

(56) References Cited

U.S. PATENT DOCUMENTS

| 6,760,582 B2 | 7/2004 | Gaal |
| 7,903,570 B2 | 3/2011 | Soomro et al. |

(Continued)

FOREIGN PATENT DOCUMENTS

| CN | 1981479 A | 6/2007 |
| CN | 101047930 A | 10/2007 |
| CN | 101262680 A | 9/2008 |

OTHER PUBLICATIONS

3rd Generation Partnership Project; Technical Specification Group Radio Access Network; Evolved Universal Terrestrial Radio Access Network (E-UTRAN); X2 application protocol (X2AP (Release 8); 3GPP TS 36.423 V8.3.0 (Sep. 2008), pp. 1-85.

(Continued)

*Primary Examiner* — Mazda Sabouri
(74) *Attorney, Agent, or Firm* — McClure, Qualey & Rodack, LLP (57) ABSTRACT

A method for measuring and reporting resource in a long term evolution system comprises: a source base station encapsulating a resource status request message and sending the message to a target base station; after receiving the resource status request message, the target base station processing the message, and sending a resource status success response to the source base station if the processing is successful, or else sending a resource status failure response if the processing is failed; the source base station encapsulating at least a message type (2), a measurement request type (3), a source base station global identifier (4) and measurement configuration information (5) in the resource status request message, wherein, the measurement request type (3) is modify; the measurement configuration information (5) is measurement configuration information (5) in current measurement request type (3).

17 Claims, 5 Drawing Sheets

(56) References Cited

U.S. PATENT DOCUMENTS

| | | |
|---|---|---|
| 8,068,513 B2 | 11/2011 | Frederiksen et al. |
| 8,284,742 B2 | 10/2012 | Seok et al. |
| 8,331,236 B2 | 12/2012 | Cavalli et al. |
| 2007/0253372 A1 | 11/2007 | Nakayasu |
| 2009/0170441 A1* | 7/2009 | Eckert et al. ............... 455/67.11 |

OTHER PUBLICATIONS

"3rd Generation Partnership Project; Technical Specification Group Radio Access Network; Evolved Universal Terrestrial Radio Access Network {E-UTRAN}; X2 application protocol {X2AP} {Release 8)";3GPP TS 36.423 V8.3.0 (Sep. 2008); pp. 19-30.

* cited by examiner

FIG. 1

| Cell name | IE type and reference information |
|---|---|
| Message type | |
| Measurement request type | Start, modify, end |
| Source eNB global identifier | eNB unique identifier |
| Measurement configuration information | |

FIG. 2

| Cell name | IE type and reference information |
|---|---|
| ->Measuring and reporting type | Such as measuring periodically or measuring for an event |
| ->Measuring and reporting period | The local cell is included if it is measuring periodically type |
| ->Measurement object | Including the hardware load, S1 interface transmission layer load (transmission bandwidth), PRB usage |
| ->Transmission bandwidth measuring and reporting direction | Upstream, downstream, upstream and downstream, which only exist when the measurement object comprises the transmission resource |
| ->PRB measuring and reporting direction | Upstream, downstream, upstream and downstream, which only exist when the measurement object comprises the PRB resource |
| ->Measurement target cell list | The number of cells is 1 to a maximum number, such as 256, which is allowed in one eNB |
| ->>Cell global identifier | Cell global unique identifier |

FIG. 3

| Cell name | Cell type and reference information |
|---|---|
| > eNB measurement configuration | |
| >> Hardware resource | Integer |
| >>> Measurement ID | Integer |
| >>> Measuring and reporting direction | Enumeration: {upstream, downstream, upstream and downstream} |
| >>> Measuring and reporting type | Enumeration: {Period, Event} |
| >>> Measuring and reporting period | Enumeration type {...} |
| >> Transmission layer resource | |
| >>> Measurement ID | |
| >>> Measuring and reporting direction | Enumeration: {upstream, downstream, upstream and downstream} |
| >>> Measuring and reporting type | Enumeration: {Period, Event} |
| >>> Measuring and reporting period | Enumeration type |
| > Cell measurement configuration | |
| >> Physical radio resource | |
| >>> Measurement list | |
| >>>> Measurement target cell global identifier | Integer |
| >>>> Measurement ID | Integer |
| >>>> Measuring and reporting direction | Enumeration: {upstream, downstream, upstream and downstream} |
| >>>> Measuring and reporting type | Enumeration: {Period, Event} |
| >>>> Measuring and reporting period | Enumeration type |
| >> Transmission layer resource | |
| >>> Measurement list | |
| >>>> Measurement target cell global identifier | Integer |
| >>>> Measurement ID | Integer |
| >>>> Measuring and reporting direction | Enumeration: {upstream, downstream, upstream and downstream} |
| >>>> Measuring and reporting type | Enumeration: {Period, Event} |
| >>>> Measuring and reporting period | Enumeration type |

FIG. 4

| Cell name | IE type and reference information |
|---|---|
| ->Measurement list | The number of the measurement lists required to be issued currently, 0 to the maximum, such as 256 |
| ->>Measuring and reporting type | Such as measuring periodically or measuring for an event |
| ->>Measuring and reporting period | The local cell is included if it is measurement periodically type |
| ->>Measurement object | One of the hardware load, S1 interface transmission layer load (transmission bandwidth), PRB usage and the like |
| ->>Measuring and reporting direction | Upstream, downstream, upstream and downstream, which only exist when the measurement object is transmission resource or PRB resource |
| ->>Measurement target cell list | The number of cells is 1 to a maximum number, such as 256, which is allowed in one eNB |
| ->>>Cell global identifier | Cell global Unique identifier |

FIG. 5

| Cell name | IE type and reference information |
|---|---|
| ->Measurement list | The number of the measurement lists required to be issued currently, 1 to the maximum, such as 256 |
| ->>Measurement ID | Measurement identifier |
| ->>Measuring and reporting type | Such as measuring periodically or measuring for an event |
| ->>Measuring and reporting period | The local cell is included if it is measuring periodically type |
| ->>Measurement object | One of the hardware load, S1 interface transmission layer load (transmission bandwidth), PRB usage and the like |
| ->>Measuring and reporting direction | Upstream, downstream, upstream and downstream, which only exist when the measurement object is transmission resource or the PRB resource |
| ->>Measurement target cell list | The number of cells is 1 to a maximum number, such as 256, which is allowed in one eNB |
| ->>>Cell global identifier | Cell global unique identifier |

FIG. 6

| Cell name | IE type and reference information |
|---|---|
| Message type | |
| Failure reason | |
| Waiting time | Indicating waiting time after failure |

FIG. 7

| Cell name | IE type and reference information |
|---|---|
| ->Message type | |
| ->eNB global identifier | NB unique identifier, indicating the information of the target eNB of the received measurement request |
| ->Failed measurement information | For all measurements in the measurement request, if some of them fail, they are returned to the source eNB for the subsequent processing, and it can be in the form of list, the number of measurements can be from 1 to the available maximum, such as 256 |
| ->>Measurement configuration information | |

FIG. 8

| Cell name | Cell type and reference information |
|---|---|
| > Message type | |
| | |
| > Target eNB identifier | |
| > Measurement end list | |
| >> Measurement ID | |

FIG. 9

RESOURCE MEASUREMENT AND REPORTING METHOD IN LONG TERM EVOLUTION SYSTEM

CROSS-REFERENCE TO RELATED APPLICATIONS

This application is a divisional application of U.S. patent Ser. No. 13/133,794, filed on Jun. 9, 2011, and entitled "Resource Measurement and Reporting Method in Long Term Evolution System", the disclosure of which is incorporated herein by reference in its entirety for all purposes.

TECHNICAL FIELD

The present invention relates to the wireless cellular communication system, and especially, to a method for measuring and reporting resource between base stations in Long Term Evolution (LTE) mobile communication system.

BACKGROUND OF THE RELATED ART

The LTE (Long Term Evolution) network consists of the E-UTRAN (Evolved Universal Terrestrial Radio Access Network) and the EPC (Evolved Packet Core), and its network has a flat structure. Wherein, the EUTRAN comprises a plurality of base stations eNBs (Evolved NodeB), and the eNBs are connected together through X2 logic interface, and the eNBs connect with the EPC through S1 logic interface. One EPC can manage one ore more eNBs, one eNB can be controlled by a plurality of EPCs, and one eNB can manage one or more cells.

In the abovementioned LTE system, eNBs inform one another of the information of the current resource status, which helps to balance the loads among the eNBs so that the overall load in the network can have the optimized effect. The information of resource status mentioned herein can be one or more of the current hardware load, S1 interface bandwidth load and the PRB (Physical Resource Block) usage. The source eNB sends a resource status request message to the target eNB, and the value assigned for the measurement request type cell comprised in the message is of enumeration type, it may be start or end. If the measurement request type contained in a resource status request message is start, the message also comprises the measurement configuration information such as the measurement and reporting period, the measurement parameters required to be measured (said measurement parameters are of enumeration type, and might comprise one or more of the hardware load, S1 interface transmission layer load (transmission bandwidth) and the PRB usage), and the cell list (including one or more cells, such as the cell global identifier) which needs to be measured and reported. After the target eNB receives the resource status request message from the source eNB, it sends the resource status failure response, which includes a failure reason, to the source eNB if the processing fails. The target eNB will send the resource status success response to the source eNB if the processing is successful. After a measurement starts, the target eNB reports the status information of the corresponding measurement parameters to the source eNB through the resource status update message, where the message comprises the cell that is measured and reported and the resource status information required to be measured currently in the cell. For the hardware load and S1 interface transmission layer load (transmission bandwidth) resource, the measurement reporting value can be represented with the coarse granularity, such as light load, normal load, over load, strongly over load, while for the resource of the PRB usage, it should be represented in a relatively accurate form, such as the usage percentage.

Since the resources required to be reported are various, it may require reporting a plurality of resource statuses in one resource status request, while in the network operation, the source eNB can require modifying the current measurement configuration according to the algorithm needs, such as modifying the measurement and reporting period, reducing or increasing the measurement parameters to be reported, or asking for ending some resource status measurements, however, there is no corresponding implementation mechanism in the prior art.

CONTENT OF THE INVENTION

The technical problem to be solved by the present invention is to provide a method for measuring and reporting resource in the LTE system to easily modify or end any resource status measurement during network operation after initiating a plurality of resource status measuring and reporting among base stations.

To solve the abovementioned technical problem, the present invention provides a method for measuring and reporting resource in a long term evolution system, a source base station encapsulating a resource status request message and sending the resource status request message to a target base station; after receiving the resource status request message, the target base station processing the resource status request message, and sending a resource status success response to the source base station if the processing is successful, or else sending a resource status failure response if the processing is failed; the method comprises: the source base station encapsulating at least a message type, a measurement request type, a source base station global identifier and measurement configuration information in the resource status request message, wherein, a value of the measurement request type is of enumeration type, and the value is one or more of start, modify and end;

the measurement configuration information is measurement configuration information in current measurement request type.

Furthermore, the method may further have the following features:

the source base station encapsulating at least a measuring and reporting type, a measurement object and a measurement cell list in the measurement configuration information, wherein:

the measuring and reporting type is measuring periodically or measuring for an event;

the measurement object comprises at least one or more of hardware load, transmission bandwidth and physical resource block usage;

the measurement cell list comprises a cell global identifier to uniquely identify each cell.

Furthermore, the method may further have the following features:

the source base station encapsulating one or more measurement lists in the measurement configuration information, and each the measurement list comprising at least a measuring and reporting type, a measurement object and a measurement cell list, wherein:

the measuring and reporting type is measuring periodically or measuring for an event;

the measurement object comprises at least one or more of hardware load, transmission bandwidth and physical resource block usage;

the measurement cell list comprises a cell global identifiers to uniquely identify each cell.

Furthermore, the method may further have the following features:

the source base station further allocating a measurement ID to the measurement configuration information in the measurement list, and encapsulating the measurement ID in a corresponding measurement list.

Furthermore, the method may further have the following features:

when the measuring and reporting type is measuring periodically, the source base station further encapsulating a reporting period in the measurement configuration information;

when the measurement object comprises the transmission bandwidth or the physical resource block usage, the source base station also encapsulating measuring and reporting direction in the measurement configuration information.

Furthermore, the method may further have the following features:

the source base station encapsulating base station measurement configuration and/or cell measurement configuration in the measurement configuration information, wherein:

the base station measurement configuration comprises hardware resource measurement configuration and/or transmission layer resource measurement configuration;

the cell measurement configuration comprises transmission layer resource measurement configuration and/or physical radio resource measurement configuration.

Furthermore, the method may further have the following features:

the hardware resource measurement configuration and the transmission layer resource measurement configuration comprises at least a measuring and reporting type and a measuring and reporting direction;

the transmission layer resource measurement configuration and the physical radio resource measurement configuration comprises one or more measurement cell lists, and the measurement cell lists comprise at least a cell global identifier to uniquely identify each cell, a measuring and reporting type, a measuring and reporting direction;

the measuring and reporting type is measuring periodically or measuring for an event, and if the measuring and reporting type is measuring periodically, the measurement configuration also comprises a measuring and reporting period.

Furthermore, the method may further have the following features:

the source base station further allocating a measurement ID for one or more of the hardware resource measurement configuration, the transmission layer resource measurement configuration, the transmission layer resource measurement configuration and the physical radio resource measurement configuration, and also encapsulating the measurement ID into a corresponding measurement configuration.

Furthermore, the method may further have the following features:

the target base station also encapsulates a waiting time when encapsulating the resource status failure response, and then sends the encapsulated resource status failure response to the source base station;

after receiving the resource status failure response sent by the target base station, the source base station times the waiting time in the resource status failure response, and resends the resource status request message to the target base station when the waiting time is out.

Furthermore, the method may further have the following features:

when encapsulating the resource status success response message, the target base station constructs failed measurement information and encapsulates the failed measurement information in the resource status success response and sends the resource status success response to the source base station according to parameters encapsulated in the measurement configuration information in the resource status request message received by the target base station.

Furthermore, the method may further have the following features:

after sending the resource status request message to the target base station, the source base station also encapsulating a measurement end message, where the measurement end message includes at least a message type and a measurement end list, the measurement end list comprises a measurement ID of the measurement configuration in the resource status request message;

After receiving the measurement end message, the target base station locally searching for the measurement configuration information corresponding to the measurement ID according to the measurement ID in the measurement end message, and ending measuring and reporting according to the searched out measurement configuration information.

Furthermore, the method may further have the following features:

when the target base station processes the resource status request message, if the target base station judges that the measurement request type in the resource status request message is end and there is no measurement configuration information, the target base station ending all resource status measurements currently performed.

The method for measuring and reporting resource in LET system according to the present invention makes it easily to modify or end any resource status measurement during the network operation after a plurality of resource status measuring and reporting are launched among the eNBs, so as to make the resource status measuring and reporting among the eNBs more flexible and convenient, thus effectively reducing the number of information exchanges among the eNBs and avoiding the network load generated due to the unnecessary information exchanges.

BRIEF DESCRIPTION OF DRAWINGS

FIG. 4 is the structure of a second kind of measurement configuration information in accordance with an embodiment of the present invention;

FIG. 5 is the structure of a third kind of measurement configuration information in accordance with an embodiment of the present invention;

FIG. 6 is the structure of a fourth kind of measurement configuration information in accordance with an embodiment of the present invention;

PREFERRED EMBODIMENTS OF THE PRESENT INVENTION

The present invention provides a method for measuring and reporting resource in the LTE system, in which measurement configuration can be modified between eNBs during network operation by modifying the resource status request message, thus making the resource status measuring and reporting among the eNBs more flexible and convenient, and benefiting implementation of resource status exchange among the eNBs and avoiding the network load generated from unnecessary information exchanges.

Figure 1:
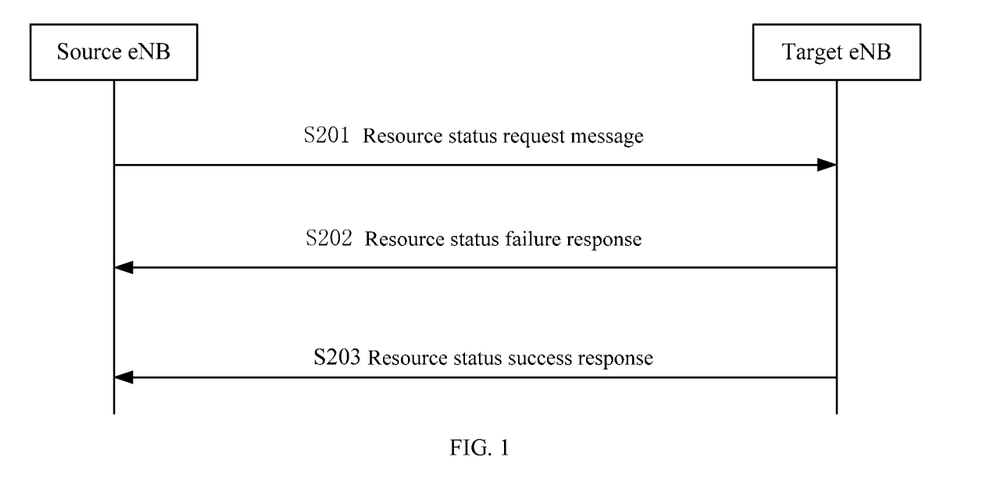
FIG. 1 illustrates the flow chart of measuring and reporting resource between the source eNB and the target eNB.

Refer to FIG. 1, it is an illustration of information exchange between the source eNB and the target eNB, and the information exchange comprises the following steps:

S201: the source eNB encapsulates a resource status request message and sends the message to the target eNB;

S202: after receiving the resource status request message, the target eNB processes the resource status request message, and sends a resource status failure response to the source eNB if the processing fails; while proceeds to S203 if the processing is successful;

S203: the target eNB sends a resource status success response to the source eNB.

In the following, embodiments will be referred to illustrate how the source eNB encapsulates the resource status request message and how the target eNB encapsulates the response message according to the resource status request message sent by the source eNB.

Figure 2:
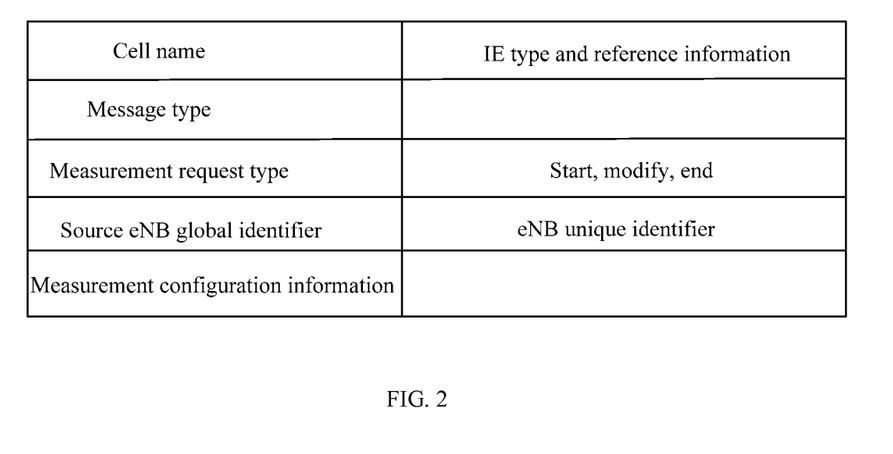
FIG. 2 is the structure of a resource status request message in accordance with an embodiment of the present invention.

Refer to FIG. 2, it illustrates the structure of a resource status request message in accordance with an embodiment of the present invention. Said resource status request message comprises at least the message type, the measurement request type, the source eNB global identifier and the measurement configuration information. Wherein:

Said message type refers to the type of the message, and for the message shown in FIG. 1, its type is resource status request.

Said measurement request type refers to the measuring and reporting type executed at the request of the message, and its assigned value is of enumeration type, including one or more of start, end and modify.

Said source eNB global identifier is used to uniquely identify the source eNB.

Said measurement configuration information comprises the configuration information of measuring and reporting that the target eNB is requested to execute.

Said resource status request message might also comprise the target eNB identifier used for uniquely identifying the target eNB.

In the following, the encapsulation parameters of said measurement configuration information in FIG. 2 will be illustrated with reference to FIGS. 3, 4, 5 and 6.

Figure 3:
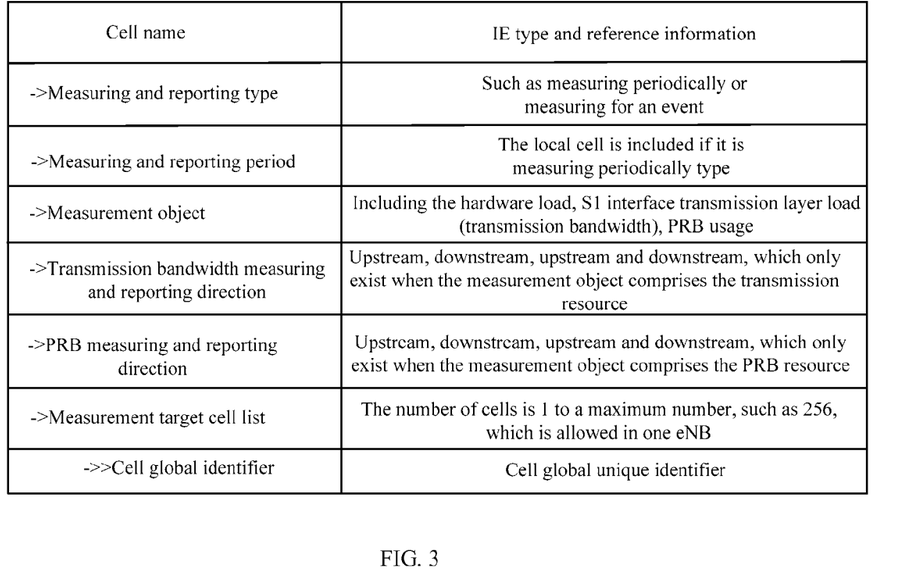
FIG. 3 is the structure of a first kind of measurement configuration information in accordance with an embodiment of the present invention.

Refer to FIG. 3, it illustrates the structure of a first kind of measurement configuration information in accordance with an embodiment of the present invention. This measurement configuration information comprises at least the measuring and reporting type, the measurement object and the measurement target cell list, wherein:

Said measuring and reporting type can be measuring periodically or measuring for an event. If the measuring and reporting type is the measuring periodically, the measurement configuration information shown in FIG. 3 should also comprise the reporting period, and said reporting period uses millisecond, second, minute or hour as the time granularity.

The value assigned for said measurement object is of enumeration type, which may comprise at least one or more of the hardware load, the S1 interface transmission layer load (transmission bandwidth), and the PRB usage. Since the measurement of the transmission bandwidth has the problem of resource direction, when the measurement objects comprise the transmission bandwidth, the measurement configuration information shown in FIG. 3 should also comprise the measuring and reporting direction of the transmission bandwidth. Since the measurement of the PRB usage also has the problem of resource direction, when the measurement objects comprise the PRB usage, the measurement configuration information shown in FIG. 3 should also comprise the PRB measuring and reporting direction. The value assigned for said transmission bandwidth measuring and reporting direction or said PRB measuring and reporting direction is of enumeration type, and it can be upstream, downstream or upstream and downstream.

Said measurement target cell list might comprise one or more target cells, wherein, each target cell corresponds to a cell global identifier used for uniquely identifying said target cell.

With reference to FIGS. 1, 2 and 3, when the measurement request type is end and there is no measurement configuration information, it can be used to indicate ending all the current resource status measurements by the target eNB.

Refer to FIG. 4, it illustrates the structure of a second kind of measurement configuration information in accordance with an embodiment of the present invention. Said measurement configuration information comprises the eNB measurement configuration and/or cell measurement configuration, wherein:

The eNB measurement configuration comprises the hardware resource measurement configuration and/or the transmission layer resource measurement configuration:

The hardware resource measurement configuration comprises at least the measuring and reporting type and the measuring and reporting direction. Said measuring and reporting type is measuring periodically or measuring for an event, if said measuring and reporting type is measuring periodically, said measurement configuration also comprises the measuring and reporting period. Preferably, the source eNB may also allocate a measurement ID to said hardware resource measurement configuration, and encapsulate the measurement ID into said hardware resource measurement configuration. Said measurement ID corresponds to said hardware resource measurement configuration (the measuring and reporting type, the measuring and reporting period and the resource measuring and reporting direction of the hardware resource).

The transmission layer resource measurement configuration comprises at least the measuring and reporting type and the measuring and reporting direction. Said measuring and reporting type is measuring periodically or measuring for an event, and if said measuring and reporting type is measuring periodically, said measurement configuration may also comprise measuring and reporting period. Preferably, the source eNB may also allocate a measurement ID to said transmission layer resource measurement configuration, and encapsulate said measurement ID in said transmission layer resource measurement and configuration. Said measurement ID corresponds to said transmission layer resource measurement configuration (the measuring and reporting type, the measuring and reporting period and the resource measuring and reporting direction of the transmission layer resource).

The cell measurement configuration comprises the transmission layer resource measurement configuration and/or physical radio resource measurement configuration:

The physical radio resource measurement configuration may comprise one or more measurement lists, and each measurement list comprises at least the cell global identifier to uniquely identify the target cell, the measuring and reporting type and the measuring and reporting direction. Said measuring and reporting type is measuring periodically or measuring for an event, and if said measuring and reporting type is measuring periodically, said measurement configuration may also comprise the measuring and reporting period. Preferably, the source eNB might also allocate measurement IDs to the measurement configurations in said measurement lists respectively, and encapsulate said measurement IDs in the corresponding measurement lists. Said measurement ID corresponds to the physical radio resource measurement configuration (the measuring and reporting type, the measuring and reporting period and the resource measuring and reporting direction of the physical radio resource) in said measurement lists.

The transmission layer resource measurement configuration may comprise one or more measurement lists. Each measurement list comprises at least the cell global identifiers to uniquely identify the target cells, the measuring and reporting type and the measuring and reporting direction. Said measuring and reporting type is measuring periodically or measuring for an event. Preferably, the source eNBs may also allocate measurement IDs to the measurement configurations in said measurement lists, and encapsulate said measurement IDs in the corresponding measurement lists. Said measurement ID corresponds to said transmission layer resource measurement configuration (the measuring and reporting type, the measuring and reporting period and the resource measuring and reporting direction of the transmission layer resource) in said measurement lists.

The definitions of said measuring and reporting type, the measuring and reporting period and the resource measuring and reporting direction in FIG. 4 are the same as those in FIG. 3, and will not be repeated here. Measurement ID is added in FIG. 4, the advantage of which is: if the target eNB saves the measurement configuration information corresponding to the measurement ID, the source eNB only sends the measurement ID corresponding to the same measurement configuration when it sends the same measurement configuration to the target eNB.

FIG. 3 and FIG. 4 can be used in the case that the value of said measurement request type shown in FIG. 2 is start, modify or end, and the measurement configuration information in FIG. 3 or FIG. 4 is defaulted as the measurement configuration information corresponding to the current measurement request type. Specifically, if the current measurement request type is start, it indicates that the target eNB is required to start the relative measurement in said measurement configuration information; if the current measurement request type is modify, it indicates that the target eNB is required to modify the measurement configuration executed currently by the target eNB according to the measurement configuration information, and execute the measuring and reporting according to the modified measurement configuration; if the current measurement request type is end, it indicates that the target eNB is required to end the relative measurement in the measurement configuration information, alternatively, when the measurement request type is end and there is no any measurement configuration information, it indicates that the target eNB is required to end all the current resource status measurements.

Refer to FIG. 5, it illustrates the structure of a third kind of measurement configuration information in accordance with an embodiment of the present invention. The measurement configuration information comprises one or more measurement lists, and each measurement list may be a measurement start list, a measurement modification list or a measurement end list. Wherein, the measurement start list comprises the measurement configuration information corresponding to the measurement start request type, the measurement modification list comprises the measurement configuration information corresponding to the measurement modification request type, and the measurement end list comprises the measurement configuration information corresponding to the measurement end request type. Each measurement list comprises at least the measuring and reporting type, the measurement object and the measurement target cell list, and if the measuring and reporting type in one measurement list is measuring periodically, the measurement configuration information shown in FIG. 5 also comprises the reporting period; if the measurement object in one measurement list comprises the transmission bandwidth or the PRB usage, the measurement configuration information shown in FIG. 5 should also comprise the measuring and reporting direction.

The definitions of said measuring and reporting type, said measurement object and said measurement target cell list are the same as those in FIG. 3, and will not be repeated here. The difference between the structure of the measurement configuration information in FIG. 5 and that in FIG. 3 and FIG. 4 is, the measurement configuration information in FIG. 5 is managed according to the measurement list, and the measurement configuration information in different measurement lists can be different, and different measurement lists correspond to different measurement request types (start, modify or end). Therefore, compared with FIG. 3 and FIG. 4, the structure of the measurement configuration information shown in FIG. 5 can carry different measurement configuration information with different measurement lists, and the same resource status request message comprises the configuration information in different measurement request types, thus largely reduce the number of resource status requests which are sent by the source eNB to the target eNB.

With reference to FIG. 1, FIG. 2 and FIG. 5, when the measurement request type is end and the number of measurement lists in the measurement configuration information is 0, it can be used to indicate ending all the current resource status measurements by the target eNB.

Refer to FIG. 6, it illustrates the structure of a fourth kind of measurement configuration information in accordance with an embodiment of the present invention. The measurement configuration information comprises one or more measurement lists, and each measurement list may be a measurement start list, a measurement modification list or a measurement end list. Wherein, each measurement list comprises at least the measuring and reporting type, the measurement object and the measurement target cell list. If the measuring and reporting type in one measurement list is measuring periodically, the measurement configuration information shown in FIG. 6 should also comprise the reporting period; if the measurement object in one measurement list comprises the transmission bandwidth or the PRB usage, the measurement configuration information shown in FIG. 6 also comprises the measuring and reporting direction.

Comparing FIG. 6 with FIG. 5, it can be seen that the difference between the structure of the measurement configuration information in FIG. 6 and that in FIG. 5 is, the source eNB also allocates a measurement ID to the measurement configuration information in the measurement list, and encapsulates said measurement ID into the measurement list. Said measurement ID corresponds to the measurement configuration information in the measurement list where the measurement ID lies.

With reference to FIG. 1, FIG. 2 and FIG. 6, when the measurement request type is end and the number of measurement lists in the measurement configuration information is 0, it can be used to indicate ending all the current resource status measurements by the target eNB.

Since the abovementioned FIG. 5 and FIG. 6 adopt the measurement list to manage the measurement configuration information, they are suit to the case that the value of the measurement request type shown in FIG. 2 is start, modify or end.

Figure 7:
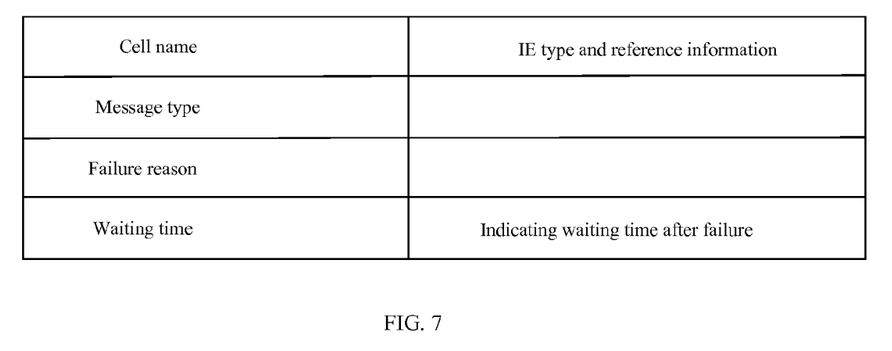
FIG. 7 is the structure of resource status failure response message in accordance with an embodiment of the present invention.

After receiving the resource status request message from the source eNB, the target eNB processes the message, and if the processing fails, the target eNB generates a resource status failure response message and sends the failure response message to the source eNB; while if the processing is successful, the target eNB generates a resource status success response message and sends the success response message to the source eNB. In the following, how the target eNB encapsulates the resource status failure response message as well as the resource status success response message will be described:

Refer to FIG. 7, it illustrates the resource status failure response message in accordance with an embodiment of the present invention. The message might comprise the message type, the failure reason and the failure waiting time. After the source eNB receives this failure response message from the target eNB, it times the failure waiting time in the failure response message, and when it times out, the source eNB resends the resource status request message to said target eNB.

Figure 8:
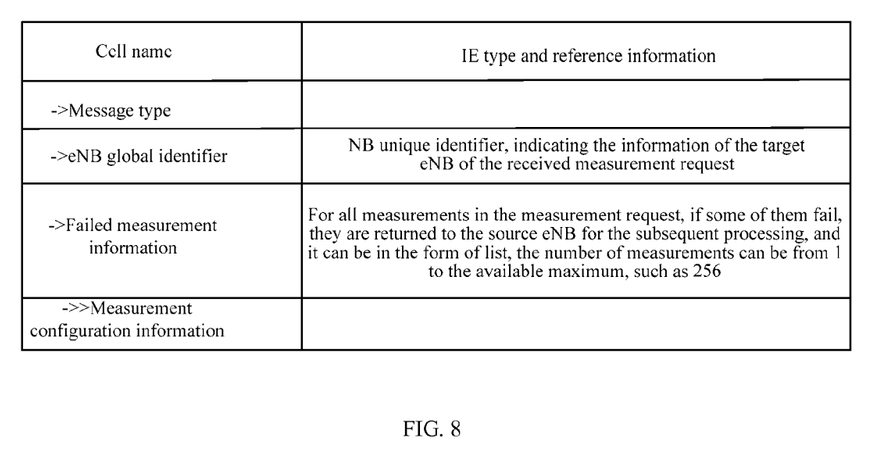
FIG. 8 is the structure of resource status success response message in accordance with an embodiment of the present invention.

Refer to FIG. 8, it illustrates the resource status success response message in accordance with an embodiment of the present invention. The message might comprise the message type, eNB global identifiers and the failed measurement information. Wherein, the target eNB encapsulates said failed measurement information according to the structure of the measurement configuration information in the received resource status request message. Specifically, if the measurement configuration information in the resource status request message received by the target eNB is as shown in FIG. 3, said failed measurement information in the success response message encapsulated by the target eNB also correspondingly comprises the measuring and reporting type, the reporting period, the measurement object, the resource reporting direction, and the cell list information of the failed measurement, moreover, the cell global identifier is included in the cell list information; if the measurement configuration information in the resource status request message received by the target eNB is as shown in FIG. 6, said failed measurement information in the success response message encapsulated by the target eNB also correspondingly comprises one or more measurement failure list, and each measurement failure list comprises the measuring and reporting type, the reporting period, the measurement object, the resource reporting direction, and the failed cell list, moreover, the cell global identifier is included in the cell list.

For the measurement configuration structure, for example, as shown in FIG. 4 and FIG. 6, since it comprises the measurement ID allocated by the source eNB for the measurement configuration information, when the target eNB encapsulates said failed measurement information, it might also only encapsulate the measurement ID corresponding to the failed measurement information; after the source eNB receives said resource status success response message, it can acquire the failed measurement information according to the measurement ID corresponding to the failed measurement information and the measurement configuration information corresponding to the locally saved measurement ID.

Figure 9:
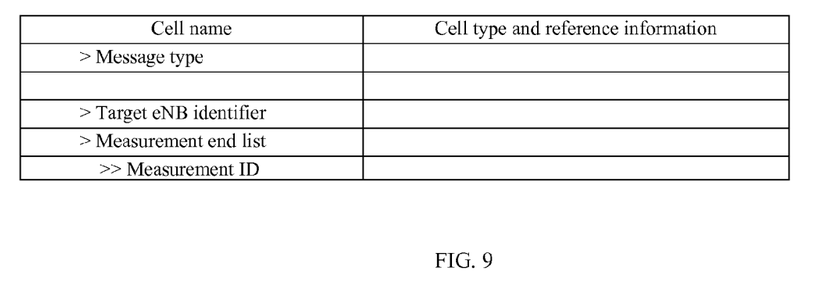
FIG. 9 is the structure of measurement ending message in accordance with an embodiment of the present invention.

Measurement ID is comprised in the measurement configuration information shown in FIG. 4 and FIG. 6, and as mentioned above, the advantage of introducing the measurement ID is, if the target eNB saves the measurement configuration information corresponding to the measurement ID, when the source eNB resends the same measurement configuration to the target eNB, it may only resends the measurement ID corresponding to the same measurement configuration. Therefore, an embodiment of the present invention also provides a preferred structure of the measurement end message. Refer to FIG. 9, said measurement end message comprises the message type and the measurement end list, and said measurement end list comprises the measurement ID corresponding to the measurement to be ended. After the target eNB receives said measurement end message, it searches for the measurement configuration corresponding to the locally saved measurement ID according to the measurement ID in the measurement end message, and ends the measurement according to the searched out measurement configuration. Said measurement end message might also comprise the target eNB identifiers uniquely identifying the target eNBs.

Of course, the present invention can have other embodiments, those skilled in the field may make various corresponding modification and transformation according to the present invention without departing from the spirit and essence of the present invention, and which should belong to the scope of the appended claims of the present invention.

INDUSTRIAL APPLICABILITY

The present invention provides a method for measuring and reporting resource in the LTE system, in which when the source eNB encapsulates the resource status measurement request message, it adds the type of modify in the measurement request types to conveniently modify the measurement configuration during the network operation and reduce the number of information exchanges among the eNBs after a plurality of resource status measuring and reporting are launched among the eNBs; the measurement list is adopted to manage the measurement configuration information and a multiple group of different measurement configuration information can be carried in a plurality of measurement lists, said a plurality of measurement lists can also correspond to different measurement request types and carry more measurement configuration information, thus effectively reduce the number of information exchanges among the eNBs; since a measurement ID is allocated to the corresponding measurement configuration information, just including one measurement ID in the measurement end message can end the measurement.

What is claimed is:

1. A method for measuring and reporting resource in a long term evolution system, the method comprising: a source base station encapsulating a resource status request message and sending the resource status request message to a target base station; after receiving the resource status request message, the target base station processing the resource status request message, and sending a resource status success response to the source base station if the processing is successful, or else sending a resource status failure response if the processing is failed; said source base station encapsulating at least a message type, a measurement request type and measurement configuration information in the resource status request message, wherein,
- a value of said measurement request type is of enumeration type, and the value is modify;
- said measurement configuration information is measurement configuration information in current measurement request type.

2. A method of claim 1, further comprising: said source base station encapsulating at least a measuring and reporting type, a measurement object and a measurement cell list in said measurement configuration information, wherein:
- said measuring and reporting type is measuring periodically or measuring for an event;
- said measurement object comprises at least one or more of hardware load, transmission bandwidth and physical resource block usage;
- said measurement cell list comprises a cell global identifier to uniquely identify each cell.

3. A method of claim 1, further comprising: said source base station encapsulating one or more measurement lists in said measurement configuration information, and each said measurement list comprising at least a measuring and reporting type, a measurement object and a measurement cell list, wherein:
- said measuring and reporting type is measuring periodically or measuring for an event;
- said measurement object comprises at least one or more of hardware load, transmission bandwidth and physical resource block usage;
- said measurement cell list comprises a cell global identifier to uniquely identify each cell.

4. A method of claim 3, further comprising:
- said source base station further allocating a measurement ID to the measurement configuration information in said measurement list, and encapsulating said measurement ID in a corresponding measurement list.

5. A method of claim 2, further comprising:
- when said measuring and reporting type is measuring periodically, said source base station further encapsulating a reporting period in said measurement configuration information;
- when said measurement object comprises the transmission bandwidth or the physical resource block usage, said source base station also encapsulating measuring and reporting direction in said measurement configuration information.

6. A method of claim 3, further comprising:
- when said measuring and reporting type is measuring periodically, said source base station further encapsulating a reporting period in said measurement configuration information;
- when said measurement object comprises the transmission bandwidth or the physical resource block usage, said source base station also encapsulating measuring and reporting direction in said measurement configuration information.

7. A method of claim 1, further comprising: said source base station encapsulating base station measurement configuration and/or cell measurement configuration in said measurement configuration information, wherein:
- said base station measurement configuration comprises hardware resource measurement configuration and/or transmission layer resource measurement configuration;
- said cell measurement configuration comprises transmission layer resource measurement configuration and/or physical radio resource measurement configuration.

8. A method of claim 7, wherein:
- said hardware resource measurement configuration and said transmission layer resource measurement configuration comprises at least a measuring and reporting type and a measuring and reporting direction;
- said transmission layer resource measurement configuration and said physical radio resource measurement configuration comprises one or more measurement cell lists, and said measurement cell lists comprise at least a cell global identifier to uniquely identify each cell, a measuring and reporting type, a measuring and reporting direction;
- said measuring and reporting type is measuring periodically or measuring for an event, and if said measuring and reporting type is measuring periodically, said measurement configuration also comprises a measuring and reporting period.

9. A method of claim 8, further comprising:
- said source base station further allocating a measurement ID for one or more of said hardware resource measurement configuration, said transmission layer resource measurement configuration, said transmission layer resource measurement configuration and said physical radio resource measurement configuration, and also encapsulating said measurement ID into a corresponding measurement configuration.

10. A method of claim 1, wherein,
- said target base station also encapsulates a waiting time when encapsulating the resource status failure response, and then sends the encapsulated resource status failure response to said source base station;
- after receiving said resource status failure response sent by the target base station, said source base station times the waiting time in said resource status failure response, and resends the resource status request message to said target base station when the waiting time is out.

11. A method of claim 1, wherein,
- when the resource status request message is processed successfully by the target base station, the source base station receives a resource status success response message encapsulating failed measurement information from the target base station, wherein the failed measurement information is constructed by the target base station according to parameters encapsulated in the measurement configuration information in the resource status request message.

12. A method of claim 2, wherein,
- when the resource status request message is processed successfully by the target base station, the source base station receives a resource status success response message encapsulating failed measurement information from the target base station, wherein the failed measurement information is constructed by the target base station according to parameters encapsulated in the measurement configuration information in the resource status request message.

13. A method if claim 3, wherein,
- when the resource status request message is processed successfully by the target base station, the source base station receives a resource status success response message encapsulating failed measurement information from the target base station, wherein the failed measurement information is constructed by the target base station according to parameters encapsulated in the measurement configuration information in the resource status request message.

14. A method of claim 4, wherein,
when the resource status request message is processed successfully the target base station, the source base station receives a resource status success response message encapsulating failed measurement information from the target base station, wherein the failed measurement information is constructed by the target base station according to parameters encapsulated in the measurement configuration information in the resource status request message.

15. A method of claim 7, wherein,
when the resource status request message is processed successfully by the target base station, the source base station receives a resource status success response message encapsulating failed measurement information from the target base station, wherein, the faded measurement information is constructed by the target base station according to parameters encapsulated in the measurement configuration information in the resource status request message.

16. A method of claim 4, further comprising:
after sending the resource status request message to said target base station, the source base station also encapsulating a measurement end message, where the measurement end message includes at least a message type and a measurement end list, said measurement end list comprises a measurement ID of the measurement configuration in said resource status request message;
after receiving said measurement end message, said target base station locally searching for the measurement configuration information corresponding to said measurement ID according to the measurement ID in said measurement end message, and ending measuring and reporting according to the searched out measurement configuration information.

17. A method of claim 9, further comprising:
after sending the resource status request message to said target base station, the source base station also encapsulating a measurement end message, where the measurement end message includes at least a message type and a measurement end list, said measurement end list comprises a measurement ID of the measurement configuration in said resource status request message;
after receiving said measurement end message, said target base station locally searching for the measurement configuration information corresponding to said measurement ID according to the measurement ID in said measurement end message, and ending measuring and reporting according to the searched out measurement configuration information.

* * * * *